Patented Sept. 2, 1952

2,609,298

UNITED STATES PATENT OFFICE 2,609,298

FLAVORING MATERIAL FOR BAKED FARINACEOUS GOODS AND PROCESS OF MANUFACTURING BAKED FARINACEOUS GOODS

George W. Kirby, Yonkers, N. Y., assignor to Standard Brands Incorporated, New York, N. Y., a corporation of Delaware No Drawing. Application May 28, 1951, Serial No. 228,780

10 Claims. (Cl. 99—91)

This invention relates to a composition for use as a flavoring material in the manufacture of rye bread and other baked farinaceous goods in which an acid flavor may be desired. It also relates to a process for manufacturing such baked goods.

In the manufacture of sour breads, particularly the typical Jewish sour rye products, it is customary to employ the time-honored sour dough method wherein the dough is fermented with acid forming bacteria. This is a time consuming method and considerable skill is required to produce satisfactory bread of good flavor. Bakers generally are reluctant to take the time to make a ferment with the souring materials presently available on the market.

The object of the present invention is to provide a dry free-flowing composition which may be added directly to the dough and which imparts a tangy or acid flavor to rye bread or other baked farinaceous goods without the necessity of carrying out a special souring step. The composition is made up essentially of two ingredients, one of which is an acid substance or mixture selected from the group of edible solid organic food acids of mild flavor and acid salts thereof, for instance, fumaric acid, tartaric acid, citric acid and potassium acid tartrate. The second ingredient is a compound or mixture of compounds selected from the group consisting of acetic acid, propionic acid and edible salts of these acids, such as the sodium, potassium, calcium, magnesium and ammonium salts. These two ingredients are used in the proportion of about 75% to 95% of the first to about 5% to 25% of the second.

The composition may and preferably does contain an edible dry free-flowing carrier, diluent or filler or mixtures of such materials, for instance, rye, wheat, potato and soy bean flours and salt. If desired, a certain amount of sugar can also be used as a carrier. A small amount of any desired flavoring material may be added, such as caraway seed powder, powdered spices, onion, garlic and spice oils.

The following are examples of suitable compositions illustrating this invention:

Example I

| | Percent |
|---|---|
| Fumaric acid | 15.00 |
| Sodium diacetate | 3.00 |
| Sodium chloride | 46.275 |
| Powdered caraway seeds | 4.00 |
| Mixture of spice oils | 1.60 |
| Onion powder | 0.125 |
| Rye flour | 30.00 |

Example II

| | Percent |
|---|---|
| Glacial acetic acid (99.5%) | 1.25 |
| Sodium chloride | 33.025 |
| Mixture of spice oils | 1.60 |
| Onion powder | 0.125 |
| Powdered caraway seeds | 4.00 |
| Fumaric acid | 15.00 |
| Rye flour | 45.00 |

To make up the composition the ingredients are simply mixed together thoroughly. The composition may be used to prepare all kinds of baked farinaceous goods, in which a sour flavor is desired, for instance bread and crackers, made from any cereal flour or mixtures of two or more different cereal flours. The composition is added to the dough and may be used in any desired amount to suit the taste. Generally speaking, the quantity is sufficient to lower the pH of the finished bread substantially, thus making it more acid so that it has a more distinctive taste. In most cases the pH will be in the range of about 4.5 to about 5.4. For American type rye breads the preferred quantity of the compositions set forth in the foregoing examples is about 0.5% based on flour weight. However, this percentage can be adjusted upward or downward depending upon the intensity of flavor desired. For the typical Jewish sour rye bread a much larger quantity would be used. In fact, up to several per cent can be used.

To prepare an American medium type rye bread, 8 ounces of the composition described in Example II were incorporated in a dough made up of 25 pounds of rye flour, 75 pounds of white flour and other dough ingredients. The dough so prepared was permitted to stand until leavening had taken place and then it was cut and molded into pieces of the desired size and shaped and then baked. The finished bread had a pH of 5.35. When 8 ounces of the composition of Example I were substituted for the composition of Example II a bread having essentially the same characteristics was obtained.

To prepare a Jewish type of light rye bread, 1 pound and 8 ounces of the composition described in Example II was added to a dough batch made from 35 pounds of rye flour, 65 pounds of white flour and other dough ingredients. The finished bread had a pH of about 5.02.

Since certain changes may be made in the above process and the composition which embody the invention without departing from its spirit or scope, it is intended that all matter contained in the above description shall be interpreted as illustrative and not in a limiting sense. It is also to be understood that the following claims are intended to cover all of the generic and specific features of the invention herein described.

I claim:

1. A dry free-flowing composition for flavoring baked farinaceous goods comprising a compound of the group consisting of edible solid organic mild flavored food acids and edible solid mild flavored salts thereof, and a compound of the group consisting of acetic acid, propionic acid and edible salts of these acids, said compounds being present in the proportion of about 75% to 95% of the former to 5% to 25% of the latter.

2. A composition as claimed in claim 1 wherein the first compound is fumaric acid and the second is sodium diacetate.

3. A composition as claimed in claim 2 containing about one part by weight of sodium diacetate to five parts by weight of fumaric acid.

4. A composition as claimed in claim 1 wherein the first compound is fumaric acid and the second is glacial acetic acid.

5. A composition as claimed in claim 4 containing about one part by weight of glacial acetic acid to twelve parts by weight of fumaric acid.

6. A composition as claimed in claim 1 containing a filler.

7. A dry free-flowing composition for flavoring baked farinaceous goods comprising about 15% fumaric acid, about 3% sodium diacetate, a small amount of flavoring material and the remainder filler.

8. A dry free-flowing composition for flavoring baked farinaceous goods comprising about 15% fumaric acid, about 1.25% glacial acetic acid, a small amount of flavoring material and the remainder filler.

9. In a process of manufacturing baked farinaceous goods in which an acid flavor is desired the step of supplying to the dough batch a small amount of a compound of the group consisting of edible solid organic mild-flavored food acids and edible solid mild-flavored acid salts thereof, and a small amount of a compound of the group consisting of acetic acid, propionic acid and edible salts of these acids, the total of these compounds being composed of about 75% to 95% of the former and about 5% to 25% of the latter.

10. A process as claimed in claim 9 wherein the amount of the compounds supplied to the dough batch is sufficient to give the finished baked goods a pH of about 4.5 to about 5.4.

GEORGE W. KIRBY.

REFERENCES CITED

The following references are of record in the file of this patent:

UNITED STATES PATENTS

| Number | Name | Date |
|---|---|---|
| 1,808,108 | Hawks | June 2, 1931 |
| 2,236,867 | Bunzell | Apr. 1, 1941 |

FOREIGN PATENTS

| Number | Country | Date |
|---|---|---|
| 22,807 | Australia | 1935 |

OTHER REFERENCES

"The Chemical Senses" by Moncrieff, Leonard Hill Limited, 17 Stratford Place W. 1, London, 1944, pages 96, 97, 185, 186 and 237.